United States Patent [19]

Smith, III

[11] Patent Number: 4,854,615
[45] Date of Patent: Aug. 8, 1989

[54] METAL SEALED JOINT FOR LARGE DIAMETER ROCKET MOTOR CASINGS

[75] Inventor: Robert E. Smith, III, Stafford, Tex.

[73] Assignee: National Coupling Company, Inc., Stafford, Tex.

[21] Appl. No.: 91,829

[22] Filed: Sep. 1, 1987

Related U.S. Application Data

[63] Continuation of Ser. No. 801,477, Nov. 25, 1985, Pat. No. 4,694,859.

[51] Int. Cl.⁴ .............................................. G16J 15/46
[52] U.S. Cl. ..................................... 285/331; 285/111; 277/205
[58] Field of Search .................. 285/111, 331, 351; 277/27, 205

[56] References Cited

U.S. PATENT DOCUMENTS

| | | |
|---|---|---|
| Re. 18,296 | 12/1931 | Pierce . |
| 1,913,982 | 6/1933 | Fox .................................... 285/111 |
| 1,928,821 | 10/1933 | Santiago ............................ 285/22 |
| 2,265,267 | 12/1941 | Cowles .............................. 285/111 |
| 2,364,133 | 12/1944 | De La Noza, Sr. ............ 285/331 X |
| 2,825,590 | 3/1958 | Sutherland ....................... 286/26 |
| 3,046,026 | 7/1962 | Burrows ............................ 277/171 |
| 3,054,422 | 9/1962 | Napolitano ....................... 137/509 |
| 3,089,713 | 5/1963 | Scaramucci ..................... 285/14 |
| 3,111,179 | 11/1963 | Albers et al. .................... 175/393 |
| 3,142,498 | 7/1964 | Press ................................. 285/12 |
| 3,279,806 | 10/1966 | Bialhoushi ....................... 285/111 X |
| 3,625,251 | 12/1971 | Nelson .............................. 137/614.04 |
| 3,707,878 | 1/1973 | Treichler ........................... 92/164 |
| 3,891,246 | 6/1975 | Hopper ............................. 285/110 |
| 3,917,220 | 11/1975 | Gilmore ........................... 251/86 |
| 3,971,566 | 7/1976 | Levinsohn et al. ............. 285/331 X |
| 4,044,993 | 8/1977 | Wheeler ........................... 251/158 |
| 4,348,039 | 9/1982 | Miller ............................... 285/1 |
| 4,452,462 | 6/1984 | Karr, Jr. ........................... 277/105 |
| 4,637,470 | 1/1987 | Weathers et al. ............... 166/344 |
| 4,641,841 | 2/1987 | Regan ............................... 277/30 |
| 4,656,393 | 4/1987 | Amboss ............................ 315/5.38 |
| 4,709,726 | 12/1987 | Fitzgibbons ..................... 285/111 X |
| 4,754,780 | 7/1988 | Smith, III ........................ 137/614.04 |
| 4,768,538 | 9/1988 | Mintz et al. ..................... 137/15 |

FOREIGN PATENT DOCUMENTS

| | | |
|---|---|---|
| 0024986 | 3/1981 | European Pat. Off. . |
| 0177650 | 4/1986 | European Pat. Off. . |
| 647885 | 7/1937 | Fed. Rep. of Germany ...... 285/331 |
| 2496221 | 6/1982 | France .............................. 285/351 |
| 552435 | 4/1943 | United Kingdom ............... 284/19 |
| 552862 | 4/1943 | United Kingdom . |
| 677685 | 8/1952 | United Kingdom ............... 99/122 |
| 819421 | 9/1959 | United Kingdom . |
| 836002 | 6/1960 | United Kingdom . |
| 886133 | 1/1962 | United Kingdom . |
| 888143 | 1/1962 | United Kingdom . |
| 1325023 | 8/1973 | United Kingdom . |
| 1567373 | 3/1978 | United Kingdom . |
| 1548852 | 7/1979 | United Kingdom . |
| 1564906 | 4/1980 | United Kingdom . |
| 1588739 | 4/1981 | United Kingdom . |
| 1603670 | 11/1981 | United Kingdom . |
| 2184186 | 6/1987 | United Kingdom . |

Primary Examiner—A. Michael Chambers
Assistant Examiner—John C. Fox
Attorney, Agent, or Firm—Arnold, White & Durkee

[57] ABSTRACT

A joint for forming a sealed junction between two large diameter cylinders or rocket motor casings. A tongue-and-groove arrangement employs a pressure-energized metal seal which expands radially when the cylinders are internally pressurized. The radial expansion enhances the sealing effect of the metal seal between the tongue and the groove. The metal seal will withstand extreme pressures and temperatures which can adversely affect the sealing capability of elastomer O-rings.

9 Claims, 2 Drawing Sheets

METAL SEALED JOINT FOR LARGE DIAMETER ROCKET MOTOR CASINGS

RELATED APPLICATIONS

The present application is a continuing application of allowed co-pending U.S. patent application Ser. No. 801,477 now U.S. Pat. No. 4,094,859 and benefit of the U.S. filing date of that application, Nov. 25, 1985, is hereby claimed. U.S. patent application Ser. No. 801,477 is hereby incorporated by reference in its entirety.

FIELD OF THE INVENTION

The present invention relates to joining large diameter cylinders, such as large pipe, to form a sealed junction. More specifically, the present invention relates to a sealed joint which may be used in joining successive stages of a solid fuel rocket booster.

BACKGROUND OF THE INVENTION

The joining of large diameter cylinders or pipe is difficult for several reasons. Large diameter pipes are subject to a great deal of flexing and out-of-roundness. Out-of-roundness makes the initial joining difficult and flexing is detrimental to the integrity of the joint. Out-of-roundness is a condition which is practically impossible to eliminate in large diameter cylinders. In this context, "large diameter" refers generally to cylinders having diameters greater than 3 or 4 feet, but it can include small diameters. Flexing in a joint may result from material stress or from the containment of pressures in the cylinders.

The formation of a sealed junction between large diameter cylinders suffers from additional difficulties. In addition to out-of-roundness and flexing, the environment and operating conditions to which the joint may be subjected will adversely affect the sealing capability of the joint. Elastomer O-rings have been used to seal large diameter joints with some success. Typically, an annular groove in one cylinder member will receive the O-ring, allowing it to protrude slightly from the groove. The second cylinder member will adjoin the first member and the junction of the two members will coincide with the placement of the O-ring, thus sealing the function.

Although O-rings have been used in rocket casing joints with some success, they have certain deficiencies which render them inadequate in some circumstances. For example, elastomeric materials are vulnerable to extreme temperature variations. Wide temperature variations can cause such materials to become brittle and much less effective as sealers. The loss of flexibility in the Oring may render the seal ineffective in a flexing, large diameter joint. Further, as the sealed pressure within the casing increases, the ability of the elastomeric Oring to maintain the seal at the joint becomes suspect. As the pressure increases, greater flexing or bulging of the joint may be seen, the the extent that the O-ring seal may be blown out or severely damaged.

A sealed joint between two large diameter cylinders or pipes will preferably be capable of withstanding extreme environmental and operating conditions. The joint and seal must be rugged but yet must be flexible to accommodate flexing or bulging of the cylinder members at the joint without loss of the seal and without damage to the joint or seal member.

SUMMARY OF THE INVENTION

A first embodiment of a sealed joint for connecting two large diameter cylinders such as rocket motor casings may include a tongue-and-groove arrangement wherein the end face of one cylinder member contains the groove, while the end face of the second cylinder member includes the tongue. The tongue and groove are configured so that the tongue is inserted into the groove when the end faces of the cylinder members are joined. A metal seal member is captured in an annular region formed between the tongue and the groove. The metal seal includes a cavity which is exposed to pressure in the cylinder members. When the joint is "made up" with the metal seal captured in the groove, the seal is preferably in a "preloaded" condition, resulting in a seal between the tongue and the groove. When the joined cylinder members are internally pressurized, the seal cavity becomes pressurized. The metal seal is urged to expand radially against the tongue and against the groove, thus enhancing the sealing effect between those members. As the pressure is increased, the sealing force is increased, resulting in a seal which is improved, rather than impaired, with increased pressure.

The metal seal member is less susceptible to extremes in environmental or operating conditions and yet it is flexible enough to accommodate out-of-roundness, flexing or bulging at the joint. Additionally, axial separation at various points about the joint will not adversely affect the sealing capability of the joint.

A second embodiment of the present invention is similar to the first with the exception that the metal seal is urged to expand axially in response to pressure within its cavity. Such an arrangement has advantages in certain situations. Of course, a joint utilizing the present invention may be constructed using features of both the first and second embodiments mentioned above.

DETAILED DESCRIPTION OF PREFERRED EMBODIMENTS

Figure 1:
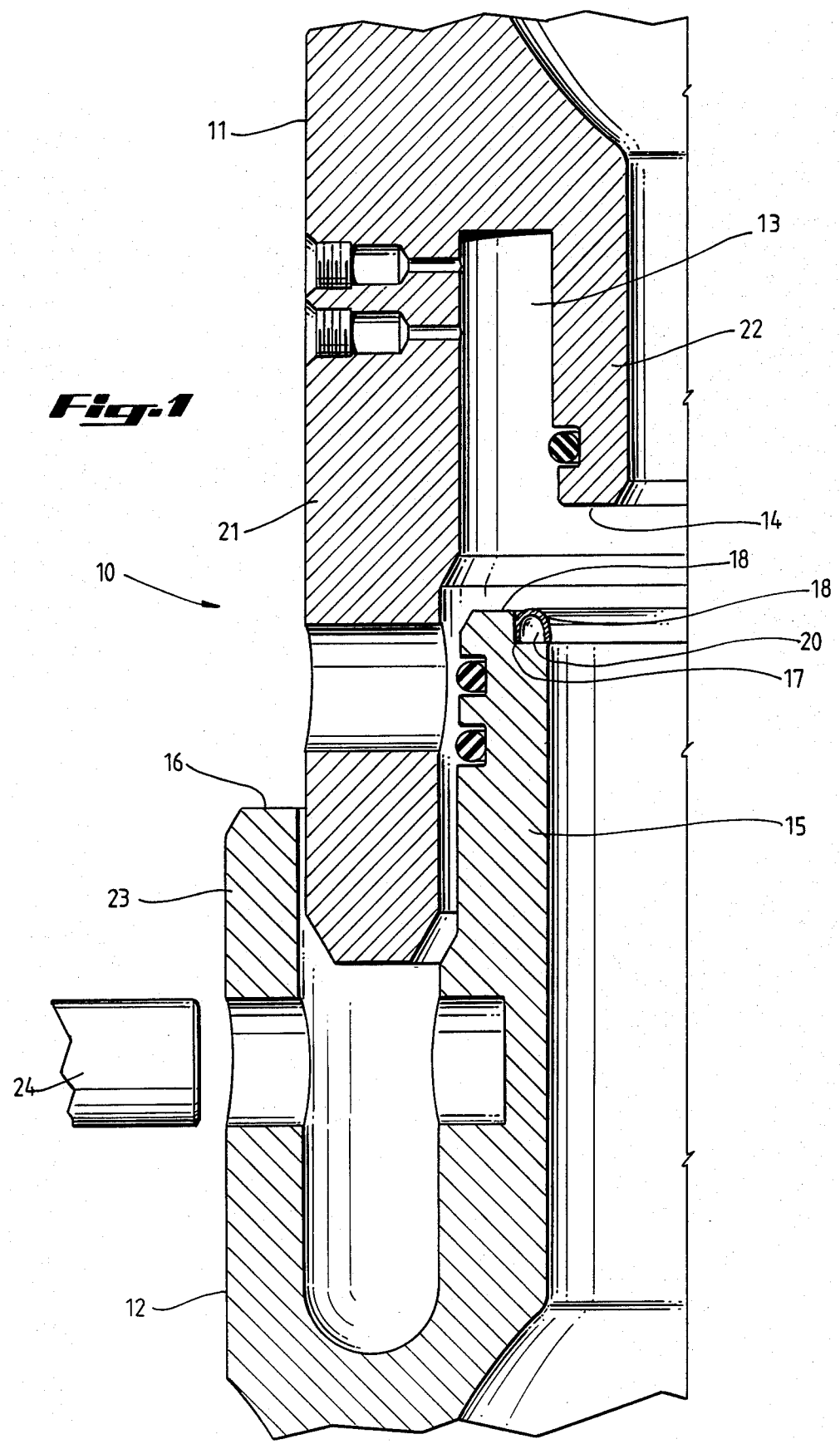
FIG. 1 is a section view showing components of a sealed joint embodying the present invention.

FIG. 1 shows a section view of components of a sealed joint 10 according to the present invention. A first cylinder or rocket motor casing 11 is to be joined end-to-end to a second cylinder or casing 12. The joint 10 between the casings 11 and 12 is to be a sealed joint, preventing the escape of pressure contained with the casings 11 and 12. The cylinder 11 may contain an annular groove 13 in its end 14 while the cylinder 12 may contain an annular tongue 15 on its end 16. The tongue 15 is adapted for insertion into the groove 13 when the ends 14 and 16 are joined.

The tongue 15 has a recessed annular seal shoulder 17 at its tip 18 for receiving a metal seal 19. When the ends 14 and 16 are joined and the tongue 15 is inserted into the groove 13, an annular space is formed by the shoulder 17 between the tongue 15 and the grove 13. The metal seal 19 is captured in this annular space, being trapped between the tongue 15 and the groove 13.

As can be seen from FIG. 1, and as described in U.S. application Ser. No. 301,477, the metal seal 19 is a C-shaped ring having an inside diameter and an outside diameter. A cavity 20 is formed between the inside and outside diameters. When the seal 19 is captured between the tongue 15 and the groove 13 when the joint 10 is assembled, its inside diameter is substantially the same as the inside diameter of the groove 13 and the seal 19 engages the groove 13. Likewise, the outside diameter of the seal 19 is substantially the same as the diameter of the tongue 15 as defined by the seal shoulder 17 and the seal 19 engages the tongue 15 at the shoulder 17. Thus, when the joint 10 is assembled, an annular space is formed by the shoulder 17 between the tongue 15 and the groove 13 and the metal seal 19 is captured within that space. The inside and outside diameters of the seal 19 engage the groove 13 and the tongue 15, respectively, forming a seal at that junction.

As will be seen more clearly below, the cavity 20 of the seal 19 is exposed to fluid or gaseous pressure which may exist within the cylinders 11 and 12. Pressure within the cavity 20 will urge the seal 19 to expand radially, reducing its inside diameter and increasing its outside diameter. This tendency to expand radially in response to pressure within the cavity 20 results in an enhanced seal between the seal 19 and the groove 13 and between the seal 19 and the tongue 15.

Figure 2:
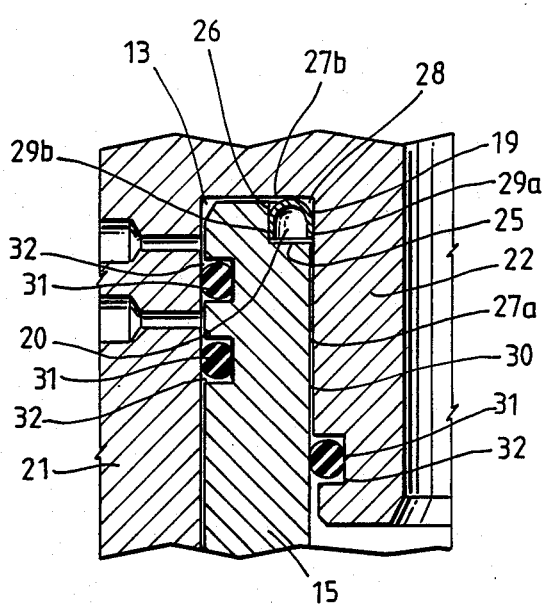
FIG. 2 is a section view showing one embodiment of a joint using the present invention.

Referring now to FIG. 2, which is an enlarged section view of a first embodiment of the present invention, the tongue 15 is shown in its inserted position within the groove 13. The groove 13 is formed between an outer wall member 21 of the cylinder 11 and a lip 22. The tongue 15 is integral with the cylinder 12 and is configured to fit within the groove 13. An outer wall member 23 of the cylinder 12 (shown in FIG. 1) is designed to engage and surround the outer wall member 21 of the cylinder 11. The outer wall member 23, outer wall member 21, tongue 15 and lip 22 cooperate to form a joint which will resist bulging and flexing when pressure within the cylinders 11 and 12 is increased. Pins 24 (shown in FIG. 1) may be used to maintain outer wall member 23, outer wall member 21 and tongue 15 in an interlocking relation.

The seal shoulder 17 includes a step 25 and a riser 26, the step 25, riser 26 and groove walls 27a and 27b forming an annular space 28. A metal C-shaped seal 19 is captured in the space 28 with its inside edge 29a engaging the groove wall 27a and its outer edge 29b engaging the seal shoulder riser 26 on the tongue 15. The groove wall 27b preferably holds the seal 19 against the step 25 so as to "preload" the seal 19 against the groove wall 27a and the riser 26. That is, the free-standing height of the seal 19 is preferably slightly greater than the distance between the groove wall 27b and the step 25. The preloading of the seal 19 results in a slight axial compression of the seal 19 and a corresponding radial expansion. However, this "preload" condition is not necessary to the practice of the present invention.

A passage 30 is generally formed between the tongue 15 and the groove wall 27a when the tongue 15 is inserted in the groove 13. This passage 30 provides fluid communication between the interior of the cylinders 11 and 12 and the cavity 20 of the metal seal 19. Fluid or gaseous pressure within the cylinders 11 and 12 will be transmitted to the cavity 20 and, because the seal 19 is restrained axially, the seal 19 will attempt to expand radially. The inner edge 29a of the seal 19 will be urged against the groove wall 27a, enhancing the sealing relation at that point. Likewise, the outer edge 29b of the seal 19 will be urged against the riser 26 of the tongue 15, enhancing the sealing relation at that point.

Any longitudinal displacement between the tongue 15 and the groove 13 will not affect the sealing capacity of the metal seal 19 so long as the displacement does not exceed the height of the seal 19. Of course, the height of the seal 19 may be adjusted so as to accommodate any reasonable displacement which might be expected.

Elastomer O-rings 31 may be used in conjunction with the metal seal 19 to provide back-up sealing capability. As is known, the O-rings may be fitted within grooves 32 to seal between the tongue 15 and the groove walls 27a and 27c.

Figure 3:
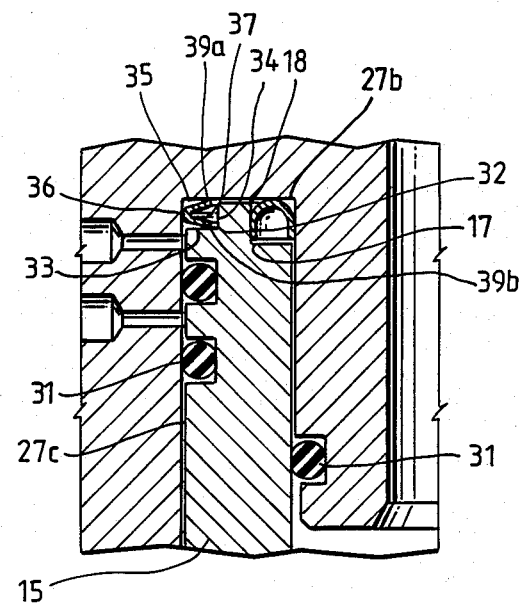
FIG. 3 is a section view of a second embodiment.

A second embodiment of the present invention is illustrated in FIG. 3. This second embodiment is a modification of the first embodiment in that a second annular seal shoulder 32 is added to the tongue 15, this second shoulder 32 being concentric with the first shoulder 17. This second shoulder 32 includes a step 33 and a riser 34. The first and second shoulders 17 and 32 are separated by the tip 18 of the tongue 15. When the tongue 15 is inserted into the groove 13, a second annular space 35 is created in the groove 13 by the shoulder 32 between the tongue 15 and the groove walls 27b and 27c.

A second metal seal 36 having a cavity 37 is adapted to be captured in the second space 33. This second seal 36 is also C-shaped in its cross-section but is configured to expand axially in response to pressure within its cavity 37. Upon insertion of the tongue 15 into the groove 13, the second seal 36 is "preloaded" by slight axial compression between the step 33 and the groove wall 27b. The amount of axial compression of the seal 36 will be limited by the distance between the step 33 and the groove wall 27b. The free-standing height of the seal 36 is preferably slightly greater than that distance so as to result in a slight axial compression of the seal 36 upon insertion of the tongue 15 into the groove 13.

A passage 38 provides fluid communication between the first annular space 28 and the second annular space 35. As a result, any fluid or gaseous pressure not contained by the first metal seal 19 will be transmitted to the second space 35 and the cavity 37 of the second metal seal 36. In response to such pressure, the second seal 36 is urged to expand axially, with seal edge 39a being urged against the groove wall 27b and the seal edge 39b being urged against the step 33 on the tongue 15. The sealing function of the second seal 36 is thus enhanced.

Figure 4:
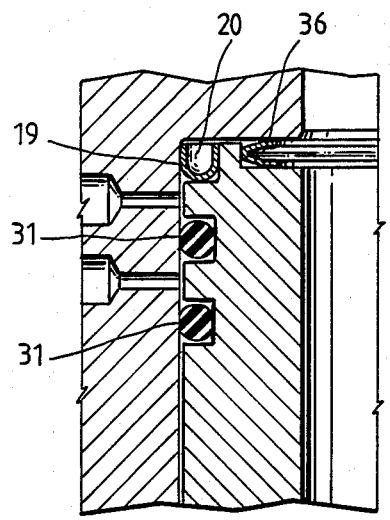
FIG. 4 is a section view of a third embodiment.

A third embodiment of the present invention is illustrated in FIG. 4. This third embodiment is similar to the above-described second embodiment in that both a radial seal 19 and an axial seal 36 are employed. One difference between this third embodiment and the second is that the relative locations of the seals 19 and 36 are reversed. A second difference involves the orientation of the radial seal 19. In this third embodiment, the radial seal 19 is "turned over" relative to its orientation in the first and second embodiments. the seal 19 is turned over so that its cavity 20 may remain in fluid communication with the interior of the cylinders 11 and 12. The structure and operation of this third embodiment are very similar to that of the second embodiment and will not be discussed in great detail.

The third embodiment shown in FIG. 4 will be advantageous in certain situations. Where the lip 22 is omitted from the cylinder 11 (see FIGS. 1 and 2), the groove 13 effectively becomes a slot 13. The axial seal 36 may be used as the inner, or primary, seal while the radial seal 19 may be used as the outer, or back-up, seal.

As in the case of the first embodiment shown in FIG. 2, the second and third embodiments of FIGS. 3 and 4 may include elastomer seals 31.

Figure 5:
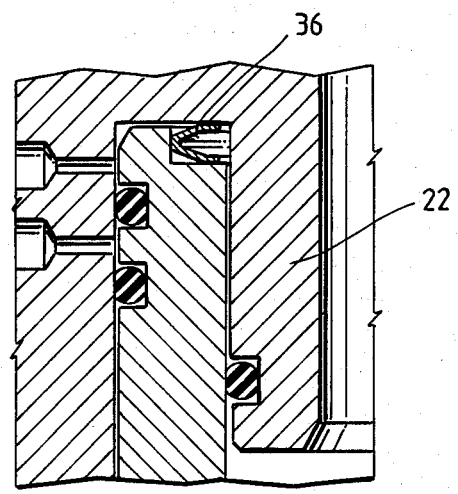
FIG. 5 is a section view of a fourth embodiment.

Still a fourth embodiment is shown in FIG. 5, wherein an axial metal seal 36 is used as the only metal seal in the joint 10. This embodiment is similar to that shown in FIG. 4 with the omission of the radial metal seal 19. As can be easily seen, the embodiments shown in FIGS. 4 and 5 may each be employed whether the lip 22 is present or not.

Variations in the embodiments illustrated may be made without departing from the present invention. The outer wall members 21 and 23 shown in FIG. 1 may be eliminated, leaving only the tongue 15 and the groove 13. Additionally, the seal shoulder 17 may be replaced by a seal groove in one side of the tongue 15, similar to the grooves 32, and the seal shoulder 32 may be replaced by a seal groove in the tip 18 of the tongue 15. Such variations may have advantages in certain situations.

The present invention should be limited only by the scope of the appended claims.

What is claimed is:

1. A joint forming a sealed junction between two large diameter radially flexible cylinders, comprising:
   an annular groove in an end of a first cylinder;
   an annular tongue on an end of a second cylinder, the tongue configured to fit within the groove when the ends of the first and second cylinders are joined;
   an annular shoulder on the tongue, the shoulder forming an annular region between the tongue and the groove; and
   a flexible metal seal for positioning on the shoulder and for entrapment in the annular region between the tongue and the groove,
   the seal including a cavity exposed to pressure within the cylinders,
   the seal engageable with the surfaces of the tongue and groove and being responsive to pressure within the cavity to be urged to expand radially to seal against the tongue and groove and maintain the radial seal during flexing and/or bulging of the cylinders in response to internal temperature and/or pressure.

2. The joint of claim 1, wherein the shoulder includes a seal seat and a riser, the metal seal being captured radially between the riser and the groove.

3. The joint of claim 1, further comprising:
   a second annular shoulder on the tongue, the second shoulder forming a second annular region between the tongue and the groove, the second annular region being concentric with the first annular region; and
   a second metal seal for entrapment in the second annular region,
   the second metal seal having a cavity exposed to pressure within the cylinders,
   the second metal seal responsive to pressure within the cavity to be urged to expand axially against the tongue and the groove.

4. The joint of claim 3, wherein the tongue further includes a stop shoulder for limiting insertion of the tongue into the groove.

5. The joint of claim 4, wherein the second metal seal is captured axially between the second shoulder and the groove, and wherein insertion of the tongue into the groove causes the second seal to be axially preloaded, the stop shoulder controllably limiting the amount of axial preload imposed on the second seal.

6. The joint of claim 3 wherein the first annular region has a diameter less than the second annular region and wherein the first metal seal has a diameter less than the second metal seal.

7. The joint of claim 3 wherein the first annular region has a diameter greater than the second annular region and wherein the first metal seal has a diameter greater than the second metal seal.

8. The joint of claim 1, wherein the annular groove comprises outer and inner parallel surfaces, and the annular tongue comprises outer and inner parallel surfaces, the metal seal sliding along the mating parallel surfaces of the annular tongue and groove to maintain sealing engagement therebetween.

9. A joint for forming a sealed junction between two cylindrical rocket motor casings, comprising:
   a first end on a first cylinder, the first end having a first annular tongue and an annular capture tongue, the first tongue and the capture tongue being concentric and forming a first annular groove therebetween;
   a second end on a second cylinder, the second end having a second annular tongue and an annular seal tongue, the second tongue and the seal tongue being concentric and forming a second annular groove therebetween,
   the first tongue configured to engage the second groove and the seal tongue configured to engage the first groove upon joining the first and second ends;
   a seal groove on the seal tongue, the seal groove including a seal seat and seal riser;
   a flexible metal seal, having a cavity, for positioning on the seal seat, the metal seal being captured in the seal groove when the seal tongue is inserted into the first groove, the seal being deformable to maintain sealing engagement between the seal riser and the first groove during flexing and/or bulging of the first and second cylinders;
   the metal seal responsive to pressure in the cavity to be urged to expand radially to seal against the seal riser and against the first groove.

* * * * *